April 2, 1974   A. S. KING   3,801,482

METHOD AND APPARATUS FOR FLOCCULATION OF DISSOLVED SUBSTANCES

Filed Oct. 17, 1972

United States Patent Office 3,801,482
Patented Apr. 2, 1974

3,801,482
METHOD AND APPARATUS FOR FLOCCULATION OF DISSOLVED SUBSTANCES
Arthur S. King, Leawood, Kans.
(9013 W. 51st Terrace, Merriam, Kans. 66203)
Filed Oct. 17, 1972, Ser. No. 298,278
Int. Cl. C02b 1/82; C02c 5/12
U.S. Cl. 204—152                    4 Claims

ABSTRACT OF THE DISCLOSURE

Rapid flocculation of particles contained within fluids, such as solids dissolved in water, is caused by passing the fluid first through an electrostatic treater and subsequently through an electrolytic treater so that the fluid exposed to an electrostatic field in the first treater is then subjected to electrolysis in the second treater. No plating out of particles on the electrodes of the second treater occurs because of the residual effects on the fluid of the electrostatic treater. Alternative embodiments of the electrolytic treater are adapted for pipeline connection and settling pond flotation respectively.

This invention relates to the treatment of fluids such as water by electrical equipment and, more particularly, to a method and apparatus for use in causing the coagulation or flocculation of dissolved solids from a solution so that the conglomeration of particles thus formed may be readily removed from the solution by means of a filter or settling basin or the like.

The treatment of fluids, such as water, with electricity, either by an electrostatic field or by electrolysis, is not per se new. For example, various types of electrolytic treaters have been developed in the past in which a current flow is established through a medium to be treated in order to attract charged impurity particles within the medium to one or the other of two oppositely charged electrodes of the treater. In this manner, the impurity particles which would otherwise plate out on metallic surfaces of equipment downstream from the treater such as the walls of boilers and the tubes of condensers are collected instead on the charged walls or electrodes of the treater. The treater must, of course, be periodically cleaned to remove the scale which has plated out on the electrodts.

My earlier U.S. Letters Patent 3,585,122, issued June 15, 1971, and entitled "Apparatus for Treatment of Fluids With Electric Fields," illustrates an example of an electrostatic treater in which at least one of the electrodes thereof is insulated from the fluid being treated so that no electrical current flows between the electrodes; the fluid is affected only by the electrostatic field established between the electrodes and not by any electron flow therebetween. Because no electrolysis occurs in the treater of my aforesaid patent, no plating out is caused on either of the electrodes of the treater. Instead, it is believed that the electrostatic field changes the orientation of the polar water molecules in such a manner that their affinity for one another and for the impurity particles is reduced to such an extent that the solvency of the water is improved. Moreover, the dissolved impurity ions are apparently neutralized so that they may combine with one another in an action resembling nucleation or coagulation, to be subsequently filtered out.

While the treater of my aforesaid patent has proven to be extremely successful and has been employed in a large variety of situations in which fluids of differing characters have existed, it has now been discovered that the nucleation action initiated in the electrostatic treater may be materially accelerated by coupling an electrolytic treater in series with the electrostatic treater downstream from the latter which subjects the electrostatically treated fluid to electrolysis. Amazingly, subjecting the fluid to electrolysis after it has first been subjected to an electrostatic field does not cause plating out of the impurity ions as would be the case if the electrolytic treater were used alone. Instead of plating out on either or both of the electrodes of the electrolytic heater as was the case with previous systems employing electrolysis, the impurity particles continue their nucleation at a more rapid rate than with the electrostatic treater alone such that flocculation of the particles occurs, allowing the resulting cluster, conglomeration or aggregate to readily be filtered or settled out.

Accordingly, it is one important object of the present invention to improve upon the teachings of my 3,585,122 patent by coupling an electrolytic treater in series with the electrostatic treater disclosed in said patent downstream from the electrostatic treater to materially increase the rate of nucleation and flocculation of particles contained within the fluid to be treated, all without causing plating out of the particles on the electrodes of either treater.

Another important object of the instant invention is to provide fluid treating apparatus as set forth above in which the residual effects of the apparatus on the fluid being treated are sufficiently strong that treatment of a main stream of fluid may be carried out by exposing only a relatively small, secondary stream of the fluid to the series connected treaters of the apparatus, with the treated secondary stream subsequently being discharged into the main stream for mixture therewith. This ability has particular utility in water purification systems wherein it would be impractical or undesirable to construct treaters having sufficient capacity to handle the large, main water lines of large towns and cities.

An additional important object of the present invention is to provide series connected electrostatic and electrolytic treaters in which the electrolytic treater is designed for flotation so that it may be conveniently located within a settling pond or the like for the fluid to be treated.

Figure 1:
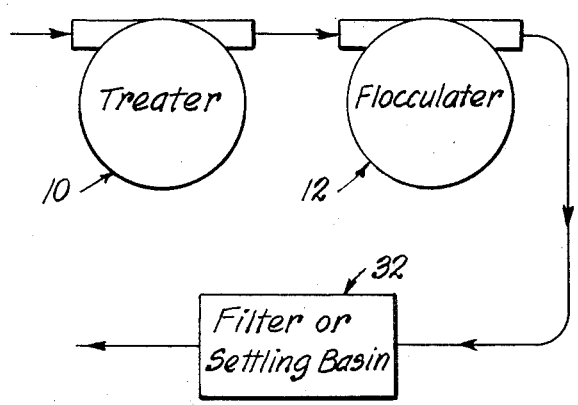
FIG. 1 is a diagrammatic view illustrating three stages of the treating process contemplated by the present invention.
Figure 2:
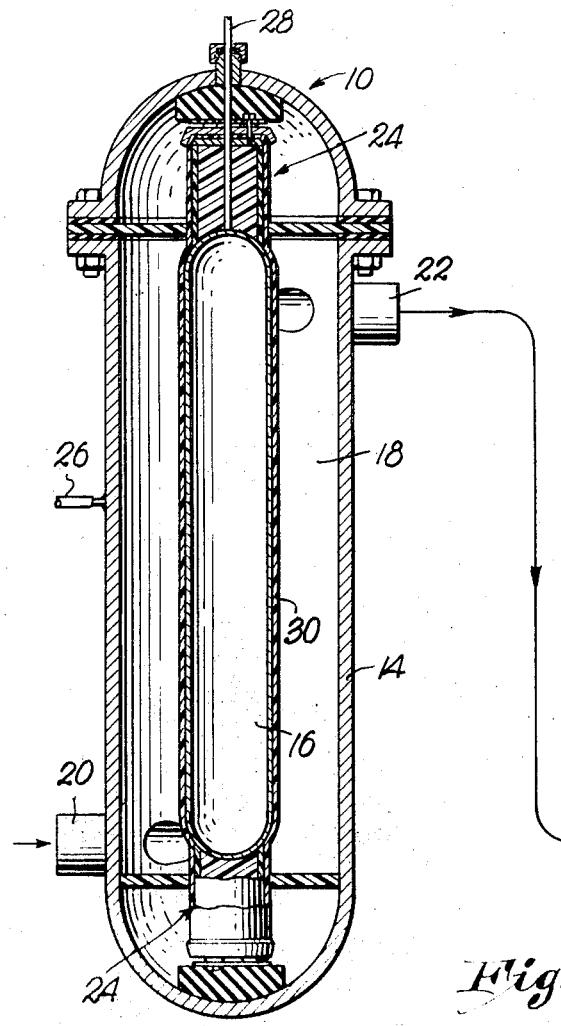
FIG. 2 is a vertical cross sectional view of illustrative embodiments of an electrostatic and an electrolytic treater coupled in series in accordance with the teachings of the present invention.
Figure 2:
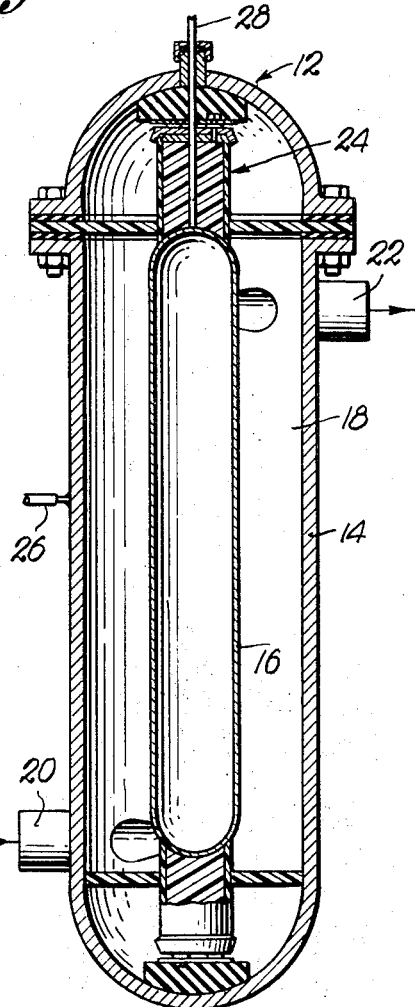

Referring initially to FIGS. 1 and 2, the electostatic treater 10 and the electrolytic treater 12 (designated "flocculator" in FIG. 1) have, for purposes of illustration only, been shown as substantially identical to the treater in Figure 8 of my aforesaid U.S. Letters Pat. 3,585,122, except for the fact that the electrolytic treater 12 has neither of its electrodes insulated from the treating fluid. Accordingly, said patent is hereby incorporated by reference into the present specification for a full and clear understanding of the construction of treaters 10 and 12 and their basic principles of operation, including the behavior of the water molecules and impurity particles when subjected to the electrostatic field.

Basically, as set forth in said patent, each treater 10 and 12 has a metal outer shell 14 which forms an outer electrode and an inner, tubular electrode 16 which is concentrically disposed within outer electrode 14 in spaced relationship thereto to define an annular treating region 18 located between an inlet 20 and an outlet 22 of the outer electrode 14. It is to be noted that the inlet 20 and outlet 22 of treaters 10 and 12 are reversed from those of the treater in Figure 8 of my aforesaid patent, such that fluid entering treaters 10 and 12 is forced to flow upwardly against the effects of gravity through treating region 19. The inner electrode 16 is supported within outer electrode 14 by insulated mounting structure 24 at opposite ends of inner electrode 16 which spaces the respective ends of electrode 16 a greater distance from the corresponding ends of electrode 14 than the distance between electrodes 14 and 16 within treating region 18. In this manner, the electrostatic field created within the treater 10 is concentrated solely within treating region 18. Further enhancing the concentration of the electrostatic field of treater 10 within treating region 18 is the fact that the opposed ends of electrode 16 as well as those of electrode 14 are dome shaped or hemispherical in configuration, thereby precluding the existence of charge-concentrating surfaces at these locations. Suitable conductors 26 and 28 are connected to electrodes 14 and 16 respectively and are coupled across a source of electrical potential to charge the electrodes 14 and 16.

The basic distinction between treaters 10 and 12 lies in the electrical action imparted to the fluid flowing therethrough. In the case of treater 10, either of its electrodes 14 and 16 (preferably electrode 16) is insulated from the fluid flowing within region 18 so that no electrolysis occurs. The fluid is subjected only to an electrostatic field which is established by virtue of the insulation surrounding electrode 16, which may be any suitable dielectric material 30 but is preferably Teflon. On the other hand, neither of the electrodes 14 and 16 of the treater 12 is insulated from fluid within region 18 and therefore, electrolysis does occur as electrons are free to flow within the fluid between the electrodes 14 and 16.

Because of the electrolysis which is established within treater 12, plating out of impurity particles within the fluid such as water being treated would occur on either or both of the electrodes 14 and 16 were it not for the existence of the electrostatic treater 10 connected in series with treater 12 upstream from the latter. Amazingly, the residual effects of the electrostatic treater 10 on the fluid being treated are such that the impurity particles do not migrate to either of the electrodes 14 and 16 of treater 12, but instead attract only one another at a more rapid rate than would be possible with treater 10 alone, hence greatly accelerating nucleation and flocculation of the particles.

After passing through the treating region 18 of treater 12, the fluid is discharged through outlet 22 for the subsequent passage through a filter or settling basin 32 wherein the flocculated particles may be easily removed from the solution to leave the latter in a condition in which it is substantially free of dissolved solids.

It has further been found during experimentation with the treaters 10 and 12 that selective removal of particles such as solids dissolved in a solution may be carried out by utilizing materials for the inner electrodes 16 according to the type of substance to be withdrawn from solution. For example, it has been determined that in almost all situations, galvanized iron is suitable for outer electrode 14, but that the inner electrode 16 may be constructed from iron, aluminum, copper, or other materials. Clay, which is among the most difficult of all dissolved solids to remove from a water solution, may best be flocculated using an aluminum inner electrode. Manifestly, if a solution contains a number of different impurities, they may be removed selectively by connecting a number of the electrolytic treaters 12 in a series downstream from the electrostatic treater 10, with each of the electrolytic treaters 12 having an inner electrode 16 constructed of a material which is selected for its particular effects on the particles in solution.

It will be appreciated that the treating system above described may be used in a number of varying applications wherever particle removal is desired. For example, the treating system may be employed for purposes of pollution control wherein the effluent from an industrial facility must be disposed of safely. By passing the effluent through the treaters 10 and 12 and subsequently a filter or settling basin 32, the "cleansed" solution may subsequently be discharged into a stream while the removed particles may then be buried or reclaimed for other purposes.

Figure 3:
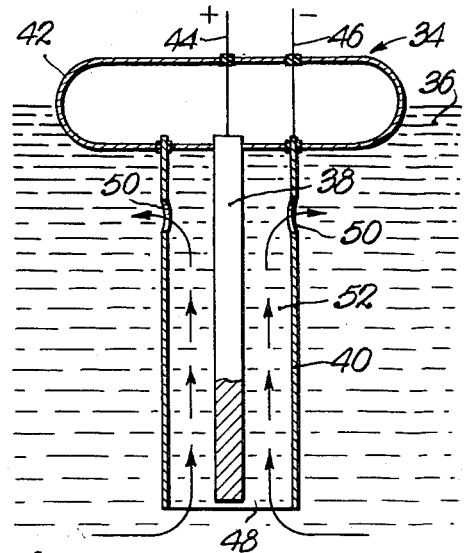
FIG. 3 is a second embodiment of the electrolytic treater forming a part of the present invention which is adapted for flotation within a settling pond or basin.

FIG. 3 shows another embodiment of the treater 12 in which an electrolytic treater 34 is designed for flotation within a settling pond, basin, or other body 36 of liquid. In this version the noninsulated, inner and outer electrodes 38 and 40 respectfully are suspended in concentric relationship from an insulating float 42 through which a pair of conductors 44 and 46 extend for connection to the inner electrode 38 and outer electrode 40 respectively.

Electrodes 38 and 40 are submerged within the body of liquid 36, and outer electrode 40 is open at its bottommost end forming a liquid inlet 48 and has a number of liquid outlet holes 50 spaced above inlet 48 so that the liquid moves by natural flow upwardly through treating region 52 between electrodes 38 and 40 and out outlet holes 50.

In this manner, liquid which has initially passed through an electrostatic treater such as the treater 10 may subsequently be discharged into the settling pond containing the body 36 of liquid, whereupon the liquid may receive the effects of treated 34. The flocculated particles will migrate to the bottom of the pond, while the cleared solution thereabove may be withdrawn for subsequent re-cycling or discharged into suitable streams or the like for disposing of the solution. Preferably, a number of the floating treaters 34 are disposed within the body of liquid 36, depending upon the size of the latter.

It has also been discovered that the strong residual action effected by the electrostatic and electrolytic treaters exemplified by treaters 10 and 12 permits the treating of a relatively small secondary stream of fluid and subsequent discharge of such secondary stream into the primary stream, instead of coupling treaters 10 and 12 directly with the main stream. In this manner, it is unnecessary to construct treaters 10 and 12 of sizes which will enable them to handle a massive flow of fluid, such as existing in the main water lines of a city or town. Instead, they may be substantially reduced from this size which, of course, result in cost savings in terms of construction, installation and maintenance. No dilution of the flocculating action has been detected in systems wherein treating of a secondary stream in this manner has been utilized.

Having thus described the invention, what is claimed as new and desired to be secured by Letters Patent is:

1. In a method of electrically treating fluids, the steps of:
   passing a fluid to be treated through an electrostatic field to neutralize particles within the fluid and initiate nucleation; and
   subsequently subjecting the fluid to electrolysis to boost the rate of nucleation of the particles to cause flocculation thereof.

2. In a method as claimed in claim 1, wherein is included the additional step of passing the fluid through a filter to remove the flocculated particles after the step of subjecting the fluid to electrolysis.

3. In a method as claimed in claim 1, wherein is included the additional step of passing the fluid through a settling basin to remove the flocculated particles after the step of subjecting the fluid to electrolysis.

4. In a method as claimed in claim 1, wherein the fluid subjected to the electrostatic field and to electrolysis is a secondary stream diverted from a main stream of the fluid, said secondary stream being returned to said main stream for mixture therewith and for treatment thereof after said secondary stream has received the effects of the electrostatic field and the electrolysis.

References Cited

UNITED STATES PATENTS

| 966,025 | 8/1910 | Lautzenhiser et al. | 204—149 |
|---|---|---|---|
| 3,458,415 | 7/1969 | Hughes, Jr., et al. | 204—149 |
| 3,718,556 | 2/1973 | Rohrback | 204—149 |

JOHN H. MACK, Primary Examiner

A. C. PRESCOTT, Assistant Examiner

U.S. Cl. X.R.

204—149, 180 R